(12) United States Patent
Lipton et al.

(10) Patent No.: US 7,099,080 B2
(45) Date of Patent: Aug. 29, 2006

(54) AUTOSTEREOSCOPIC LENTICULAR SCREEN

(75) Inventors: Lenny Lipton, Greenbrae, CA (US);
William McKee, Tiburon, CA (US);
Jeffrey James Halnon, Richmond, CA (US)

(73) Assignee: Stereo Graphics Corporation, San Rafael, CA (US)

( * ) Notice: Subject to any disclaimer, the term of this patent is extended or adjusted under 35 U.S.C. 154(b) by 434 days.

(21) Appl. No.: 09/943,890

(22) Filed: Aug. 30, 2001

(65) Prior Publication Data

US 2002/0036825 A1    Mar. 28, 2002

(51) Int. Cl.
*G02B 27/22* (2006.01)
*H04N 13/04* (2006.01)

(52) U.S. Cl. ............... 359/463; 359/462; 359/464; 359/358; 348/59

(58) Field of Classification Search .......... 359/462, 359/463, 464, 619, 629, 666, 358; 348/59, 348/51, 55, 56; 353/7; 345/5, 6
See application file for complete search history.

(56) References Cited

U.S. PATENT DOCUMENTS

| 1,128,979 | A | | 2/1915 | Hess |
| 3,600,063 | A | * | 8/1971 | Bowen ................. 359/626 |
| 5,500,765 | A | | 3/1996 | Eichenlaub ............ 359/463 |
| 5,572,250 | A | | 11/1996 | Lipton et al. ........... 348/43 |
| 6,046,855 | A | * | 4/2000 | Goto ................... 359/619 |
| 6,069,650 | A | * | 5/2000 | Battersby .............. 348/59 |
| 6,288,846 | B1 | * | 9/2001 | Stoner ................. 359/666 |
| 6,481,849 | B1 | * | 11/2002 | Martin et al. .......... 359/462 |

* cited by examiner

*Primary Examiner*—Audrey Chang
(74) *Attorney, Agent, or Firm*—Smyrski Law Group, A.P.C.

(57) ABSTRACT

An autostereoscopic lenticular screen has a lenticular screen held in juxtaposition with a display surface. The lenticular screen has lenticules disposed on one side thereof and a smooth surface on the other side thereof. In one aspect of the invention, a closed chamber is formed over the lenticules. In order to deactivate the refractive properties of the lenticular screen, and thereby view the display in a planar mode, an optically clear fluid, such as a fluoropolymer, is introduced into at least a portion of the closed chamber. In order to activate the refractive properties of the lenticular screen, and thereby view the display in a stereoscopic mode, the optically clear fluid is removed from the closed chamber. In a particularly preferred arrangement, the lenticular screen is oriented such that the lenticules face inwardly toward the display screen, and the smooth surface of the lenticular screen is coated with an antireflective material.

17 Claims, 3 Drawing Sheets

AUTOSTEREOSCOPIC LENTICULAR SCREEN

BACKGROUND

Lenticular screens have long been a means to provide the user with an autostereoscopic display allowing each eye to see a different perspective. The idea of using a corduroy-like lenticular screen and an interdigitated stereo pair was first enunciated in 1915 by Hess in U.S. Pat. No. 1,128,979, and there has been much art disclosed in the field since Hess.

Indeed, the idea of using lenticular screens with inward facing lenticules, which we employ in this disclosure, has been applied for years in the manufacture of rear projection television sets. It is the manner in which we use this configuration and improve upon it that leads to great improvements in image quality as will be described below.

When viewing a lenticular autostereoscopic display, the user does not wish to be aware of the structure or the presence of the screen. The user is concerned with seeing the image and does not wish to be subjected to any distraction. Such distractions are caused by the visibility of the lenticular screen structure itself. This is to some extent manifested by the visibility of the straight-line boundaries between lenticules, which appear to the eye as if they are (more or less) vertical going rulings. The finer the pitch of the screen, the less obtrusive this "virtual" ruling effect, but in some cases the pitch of the screen must remain large, and in all cases the problems of reflections from the surface remain, as described next.

With the lenticules facing outward, as is typical, the user is aware of the "ruling" structure as well as a considerable amount of reflection of ambient light. Annoying reflections occur at the surface of the lenticular screen. This phenomenon arises from the (more or less) horizontal refractive nature of the corduroy-like lenticular columns that create a myriad of reflections spreading across the surface of the screen.

These reflections interfere with the intelligibility of the displayed image as well as detract from the enjoyment of viewing the display. An anti-reflection (AR) coating can be difficult to apply to a surface made up of miniature lenticules. AR coatings are usually coated on smooth and continuous surfaces, and not on the corduroy-like surface of the lenticular screen.

Another problem related to the unimpaired viewing and even the intelligibility of the display has to do with the need to switch between planar and stereo states. For certain applications, especially desktop applications, the user of a lenticular autostereoscopic display may well wish to work on a word processing application or e-mail at one moment, and the next he or she may wish to see a stereoscopic image. It has been observed and understood that an application consisting of alpha numerics can become unintelligible when viewed through a lenticular screen because of its refractive properties.

If one wishes to display information on this autostereo device, the information must be formatted to accommodate the properties of the lenticular screen. In such a case, the image must be dissected into columns and within such columns, image stripes, or the user will observe an image that is garbled and unintelligible. The information, specifically alphanumerics of small to normal font size, or task bars and dialogue boxes and the like, will be difficult for the user to read. In order to cure this viewing problem, the user could remove the lenticular screen and then replace it when it is time to display stereo formatted information.

For this reason, it would be desirable to be able to "deactivate" or "neutralize" the refractive properties of the lenticular screen. One approach, as mentioned above, is to remove the screen entirely when viewing in the planar mode. But this can be cumbersome and might not meet with favor on the part of users. In addition, there is an alignment problem that might be difficult to solve since the juxtaposition of the lenticular screen and the display screen needs to be accomplished with extreme precision. But even if the problem can be solved with some pin registration system, or some other means of calibration, we are left with a solution to the problem that is intrinsically cumbersome. Even the embodiment disclosed by Eichenlaub in U.S. Pat. No. 5,500,765, clever as it is, requires the addition or removal of a lenticular screen with negatively-shaped lenticules, the purpose of which is to neutralize the refractive properties of an in-place lenticular screen.

The present disclosure takes advantage of inward facing lenticules that provide the same refractive properties as that of a lenticular screen with outwardly facing lenticules. By having the lenticules face inwardly toward the display screen, we are able to achieve a lenticular autostereoscopic display with greater clarity in the stereo mode, and thus with an enhanced sensation of image quality and depth. Inward facing lenticules makes the boundary "virtual" ruling effect disappear and allows the provision of a standard quality AR coating to the outwardly facing flat surface.

We also describe means to neutralize the refractive properties of the screen by automatic means rather than by cumbersome efforts on the part of the user. By automatic, we mean that with the push of a button, the user will be able to select between autostereo and stereo modes with optimized optical properties and clarity of image. Even better, with the change of content from stereo to planar, the unit will automatically activate or deactivate the lenticules' refractive properties.

SUMMARY OF THE INVENTION

The present invention is an autostereoscopic lenticular screen. Such devices are generally known, wherein a lenticular screen is held in juxtaposition with a display surface. The lenticular screen is preferably formed of a glass substrate with lenticules disposed on one side thereof and a smooth surface on the other side thereof. In one aspect of the invention, a closed chamber is formed over the lenticules. In order to deactivate the refractive properties of the lenticular screen, and thereby view the display in a planar mode, an optically clear fluid, such as a fluoropolymer, is introduced into at least a portion of the closed chamber. In order to activate the refractive properties of the lenticular screen, and thereby view the display in a stereoscopic mode, the optically clear fluid is removed from the closed chamber. The means for introducing and removing the fluid is preferably a syringe having a pump handle.

In a particularly preferred arrangement, the lenticular screen is oriented such that its lenticules face inwardly toward the display screen. Further, the smooth surface of the lenticular screen is coated with an antireflective material.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
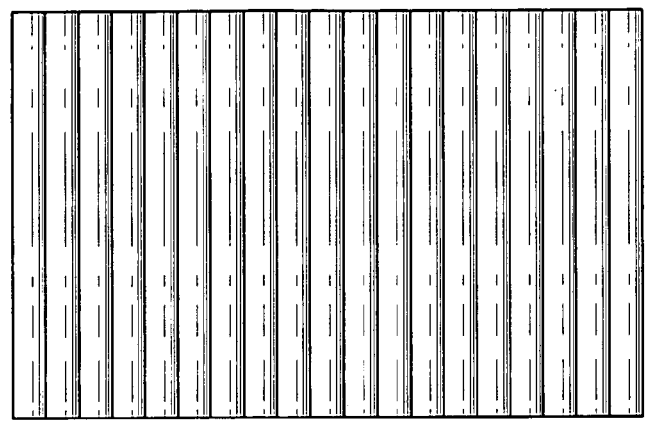
FIG. 1 is a shaded top view of a conventional lenticular screen having corduroy-like lenticules, as shown in U.S. Pat. No. 1,128,979.
Figure 2A:
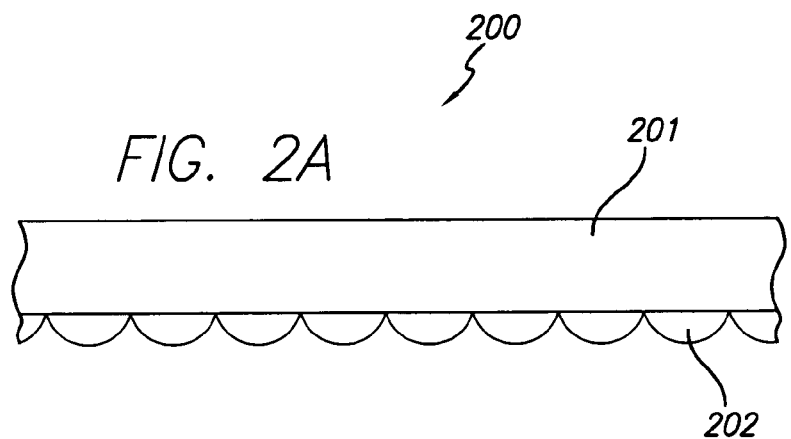
FIG. 2A shows a cross section of lenticules coated on a glass substrate.

FIG. 2A shows a cross section of a lenticular screen 200 made up of lenticules 202, which are the topmost or sector-like surfaces of long cylinders, as deposited on substrate 201. Since our concern is for lenticular screens made to match the needs of electronic flat panel displays, we favor lenticules deposited on dimensionally stable glass; that is, on glass whose thermal expansion properties match that of the display screen so that the alignment of lenticule and pixel will remain constant. However, there is no loss of generality in our teaching if the substrate is some material other than glass, or if there is no substrate at all and the lenticular screen is a part of the substrate and made of one material.

Our concern is with adding our screens to flat panel displays. We are constrained with regard to the thickness of a given panel cover-glass or faceplate. Each panel has a cover-glass that affects our ability to locate the lenticules with regard to the pixels themselves, which are located on the display surface behind the cover-glass. For this reason, having lenticules that face inwards gives us an advantage since the optical center of the lenticule is located near the sectors 202. In this way, by reversing the position of the lenticules with respect to that which is used for the traditional autostereo display, we are able to bring the optical center of the lenticules closer to the pixels. The focal length of the lenticular screen's lenticules is the principal determinate of the angle of view of the autostereo display, and the focal length cannot be less than the thickness of the faceplate. With the lenticules facing outwards the focal length would be further increased, thereby reducing the angle of view. The reader will understand that optical systems can be reversed, and that this arrangement of parts does not spoil the reflective optical effect produced by the lenticules.

Figure 2B:
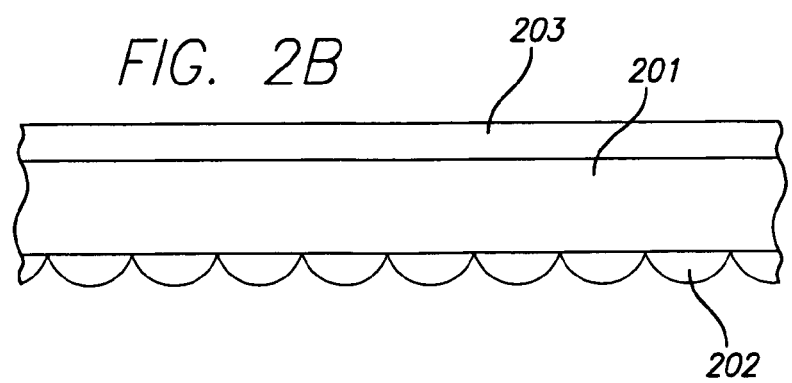
FIG. 2B shows a cross section of lenticules coated on one side of a glass substrate with an antireflective-coated surface on the opposite side of the substrate.

FIG. 2B shows a variation of the arrangement described in FIG. 2A. The difference is that an anti-reflective ("AR") coating 203 has been applied to the surface opposite the lenticules. This AR coating 203 may use any one of a number of well known thin film AR coating approaches relying on destructive interference of reflected rays of light. The glass substrate can be pre-coated, or the coating can be added after the lenticules have been applied. One technique at which we have become adept is lamination of a plastic sheet of material whose outer surface is AR coated.

Figure 3:
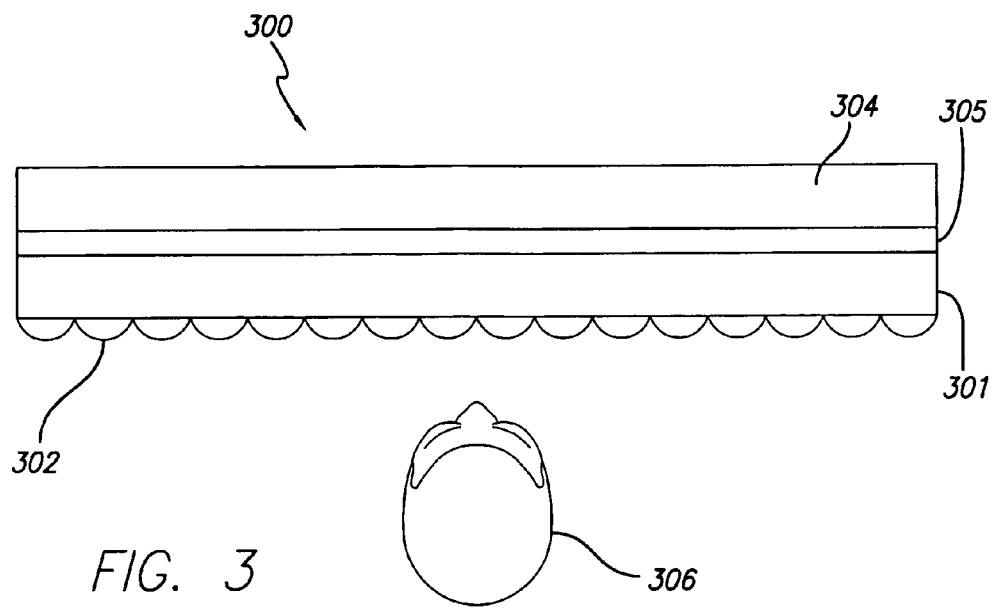
FIG. 3 shows the lenticular screen of FIG. 2B as it is used in juxtaposition with a flat panel display with the lenticules facing outward away from the display.

FIG. 3 shows us the way in which a lenticular screen 300 can be used in association with a flat panel display to obtain an autostereoscopic effect. The flat panel display 304 (with cover-glass 305) faces the viewer 306. A lenticular screen of the kind described in FIG. 2A is placed in intimate juxtaposition with flat panel display 304. The lenticular screen is made up of glass substrate 301 and lenticules 302.

Given this arrangement, two objectionable optical artifacts become immediately apparent to the eye of the beholder. In the first place, the lenticules themselves, unless they are extremely fine, are visible as an annoying pattern. In the second place, the lenticules, which are difficult to AR coat, create an array of reflections with can spoil the enjoyment of the viewing of the flat panel display 304. Lenticular screens, because of the uneven nature of their surface, and because they are made of plastic materials, may be difficult to AR coat. Such a coating has significant value since suppression of reflection will help the user better appreciate the images on the display screen.

Figure 4:
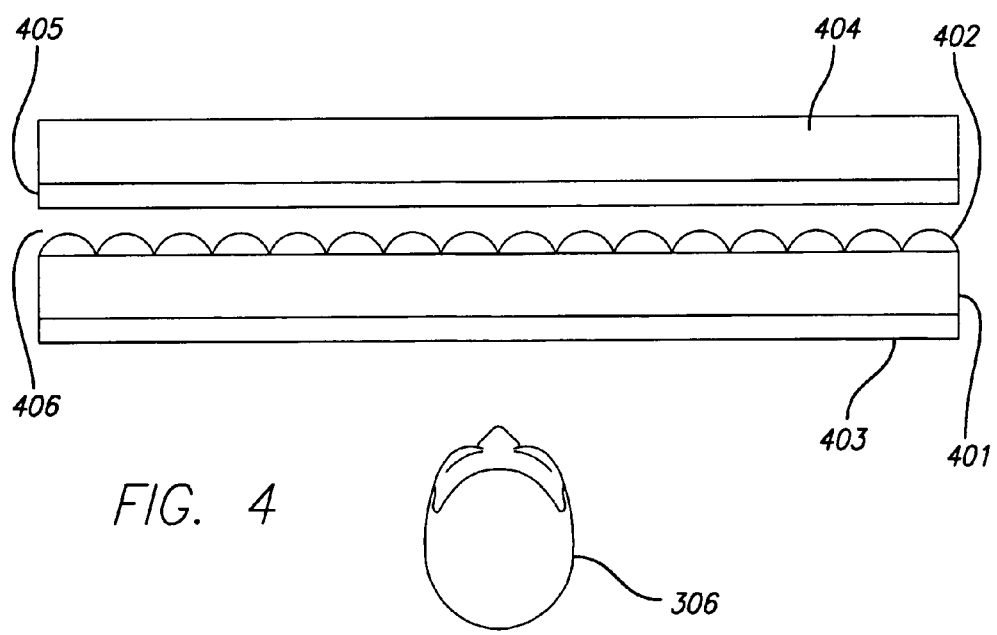
FIG. 4 shows the lenticular screen of FIG. 2B as it is used in juxtaposition with a flat panel display with the lenticules facing inward toward the display.

Therefore, we advocate the use of the method described with the help of FIG. 4 that shows the lenticules 402, which are part of the glass substrate 401, facing inward toward the flat panel display 404. There may or may not be an air gap 406 between lenticules 402 and the surface of the display 404, or more properly, the front surface of its cover-glass 405, depending upon the desired value of the focal length of the lenticules or other design parameters. The outer face of the substrate 401 is flat and it has been coated with an AR coating 403. The viewer 407 enjoys the autostereo image produced by the refractive properties of the screen. The structure of the screen itself has been rendered unobtrusive because the lenticular structure is facing away from the user and is in close juxtaposition with the surface of the display 404. Additionally and importantly, AR surface 403 is directly facing the user. By this means reflections are effectively suppressed and the viewer enjoys a superior stereoscopic image.

Figure 5:
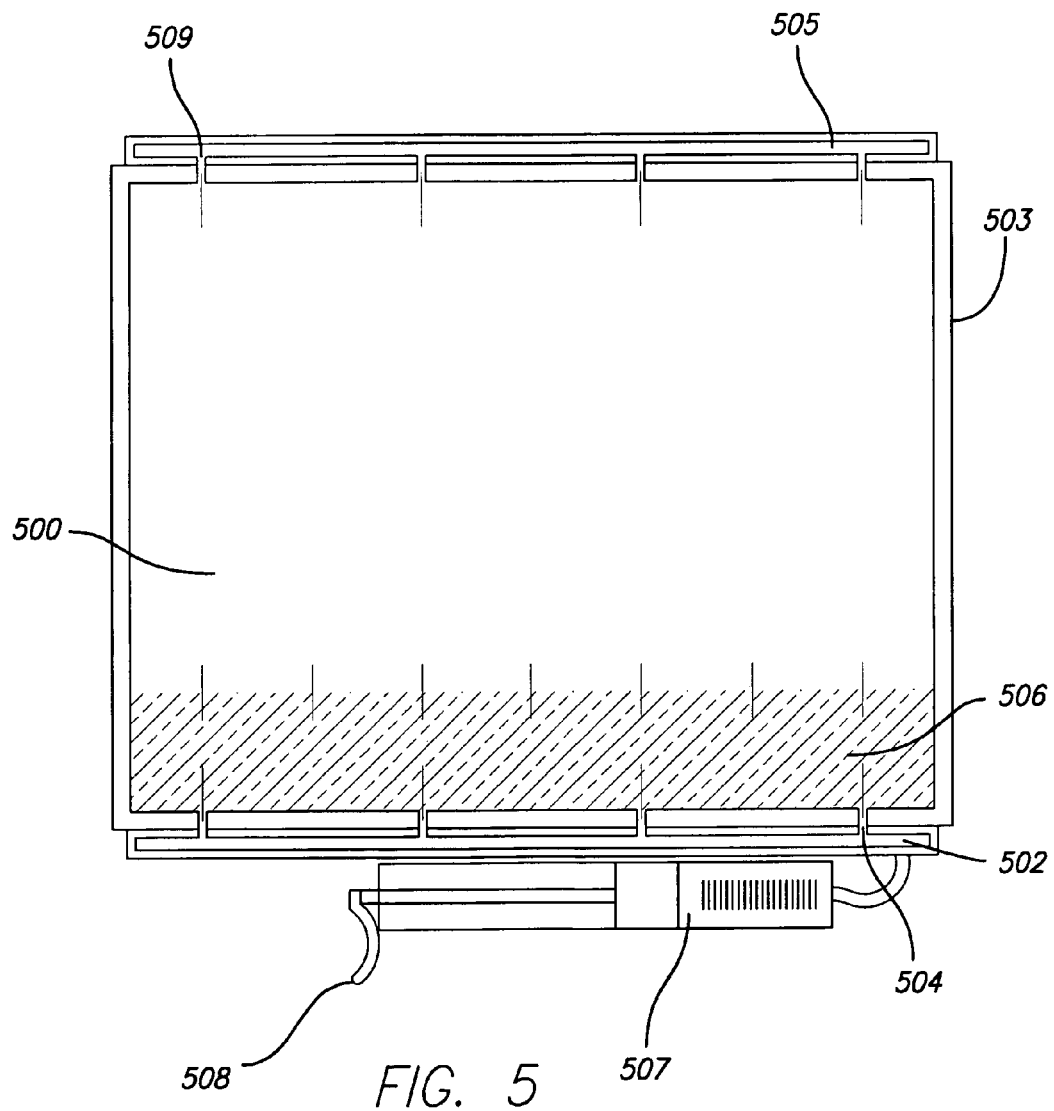
FIG. 5 is a schematic representation of a closed chamber formed between the lenticular screen and the flat panel display and having a pump to inject and remove a liquid from the interstices of inward-facing lenticules in order to nullify or activate, respectively, the refractive properties of the lenticules.

We now turn our attention to the means we employ to switch between stereo and non-stereo modes. FIG. 5 is a front view of the apparatus we are discussing as it is mounted in intimate juxtaposition with the faceplate of a flat panel display screen. The lenticular screen 500 is of the same inward facing variety as discussed with reference to FIG. 4 above. Given that the lenticules are facing inward and towards the display screen, we have provided an area or air gap 406 between the display screen faceplate 405 and the lenticules 402. We use this space to allow a liquid to enter or leave the air gap 406. The air gap 406 may be a large air gap, or it may simply consist of the interstices formed by the rounded tops of the lenticules 402 touching the faceplate 405. These interstices form a system of channels which are parallel to the boundary between adjacent lenticules and the boundaries to form cavities or depressions in the channels. We see that the chamber has outlet ports 509 (only one such typical port shown), at the top of the display through which the air within the chamber may exit. The fluid is introduced through inlet ports 504 (only one such typical port is shown) at the bottom of the display, to fill the chamber. The chamber is fabricated in a conventional manner to prevent the fluid from becoming contaminated or leaking out. A manually or electrically operated mechanism, such as a syringe, is used to contain the fluid and move it in to and out of the lenticular viewing field as desired by the user, or as automatically commanded by electronic means to be described below.

When mounting the screen in place, the entire outer edge 503 is sealed to keep the liquid from escaping and thereby forms chamber 502. As noted, fitted to the lower edge at the bottom of the display are ports 504, by which means the fluid is brought into the chamber. Along the top edge is an additional elongated expansion chamber 505 that accepts the air that is being displaced from the chamber 502 by the incoming fluid. The upper expansion chamber 505 must be large enough to house the displaced air without building pressure that would damage the seals or other system components.

We need to insure that the fluid remains optically clear and of a low viscosity to facilitate rapid influx and removal. It is necessary to also insure that the fluid and lenticular surface and faceplate material are chosen or prepared so that there is a minimum "wetting" of the lenticular surface by the fluid. This can be as simple as choosing a proper liquid or material with which to fabricate the lenticular screen, or one can also use a clear coating on the lenticular surface to achieve the same results. The surface of the display screen is likewise treated with the same type of coating so it may also not be "wetted" by the fluid. This will insure a complete removal of the fluid upon release of the pressure that kept it in place interstitially. Such coatings are commercially available and some are of the fluoropolymer type.

One must choose a fluid that has an index of refraction that is similar to, if not identical to, that of the lenticular material. Upon introduction of the fluid, shown as hatched area 506, partially filling the interstitial area, the optical or refractive effects of the lenticules becomes nullified and information formatted for planar viewing may be viewed. Upon removal of the liquid, stereo viewing is facilitated. To promote removal of the fluid we prefer to have a fluid that has a high amount of surface tension. This allows the fluid to remain as a whole entity instead of separating into small droplets within the chamber.

Moving the fluid in to and out of the chamber is preferably achieved by means of a large syringe 507 fitted into the bottom of the display bezel. Alternatively, the fluid may be stored and transferred by many well known conventional methods, such as the use of a bladder and pump (not shown). Such devices can be activated manually, for example using handle 508, or electrically, for example by an electromechanical mechanism, such as a motor assembly with appropriate gearing. One skilled in the art will understand that there are many variations that can be conceived of with regard to the pumping of fluid from a fluid reservoir into the interstitial space between lenticules in order to switch modes from autostereo to planar.

One skilled in the art will recognize that the inventive system will also work for the more traditional outward facing lenticules if a cover-glass is mounted in close proximity to the lenticular screen thus forming the outer surface of the display. In this case, the mechanism for pumping the fluid in and out of the interstitial chamber is identical to that which has already been described, as is the optical nullifying effect.

In addition, by restricting the fluid to certain areas of the display (and not others) the user will have available areas that are planar and also autostereo at the same moment. One skilled in the art can readily understand how it is possible to restrict the flow from some portions of the display and to then enable the flow from those same areas for the purpose of turning on and off the stereo effect in specified areas rather than over the entire screen surface.

Also, as will be described below, it is possible to activate the mechanism for switching between planar and autostereo modes by means of an electronic synchronization signal. This addition makes the transition less obtrusive to the user since he or she will not have to perform any action to activate the transition.

For many applications, for example consumer television, it is appropriate to coordinate the transition of fluid in or out of the interstices with a video effect, such as a fade out and a fade in. The coupling of such a video effect masks the transition from stereo to planar and vice versa, which although brief, will be rendered indiscernible by this means.

As mentioned above, an automated system can invoke the switch between planar and autostereo modes. There are a number of mechanisms for the graphics controller (in the case of computer usage) to send a message to the display. In the case of television there are similar means to automatically activate the mode switch.

One mechanism is to use a small portion of the visible image area to embed a unique sequence of particular RGB data values along a line, say the top or bottom line of the screen. The length of the sequence can be dozens or even hundreds of pixels. In such a case, the chance of creating or perceiving a false trigger is virtually zero. This trigger is in the form of either a mode switch command or a mode status command. Such a system is described in U.S. Pat. No. 5,572,250 to Lipton et al.

For a mode switch command, there is a unique sequence to direct the display to change from planar to autostereo mode. A different (but similar to reduce the cost of the decoding logic) sequence directs the display to change from autostereo to planar mode. In the absence of an identifiable sequence, the display remains in its current state. Thus, a code is visible (but on an extremely small area of the screen) each time the display is directed to change modes.

If a mode status command is employed, a unique sequence identifies an image as an autostereo image. The display then switches to the autostereo mode as long as that sequence remains embedded in the image, or possibly as a signal within the vertical or horizontal blanking areas.

A different mechanism is the use of a communication channel already established between the monitor and graphics card. Modern monitors and graphics cards implement the DDC (Data Display Channel) VESA standard. This channel normally allows the monitor to identify itself and its capabilities and to communicate that information to the graphics controller. The graphics controller responds by selecting display modes and resolutions that are appropriate. An additional capability of the DDC is an I2C bus link. The display mode can thus be controlled via the I2C bus.

Other mechanisms include any general purpose peripheral bus such as the ADB or USB; a dedicated connection via a serial or parallel port; or a "dongle" attached to an existing port such as is commonly used to read and write memory cards via a parallel printer port.

It should be understood that the invention is not intended to be limited by the specifics of the above-described embodiment, but rather defined by the accompanying claims.

We claim:

1. In an autostereoscopic display system whereby a lenticular screen is aligned in juxtaposition with a display screen, wherein the lenticular screen has lenticules on one side thereof facing the display screen, wherein the improvement comprises a closed chamber affixed between the lenticular screen and the display screen and a fluid reservoir in communication with the closed chamber and storing an optically clear fluid that is introduced and removed from the closed chamber.

2. The autostereoscopic display system of claim 1, further comprising a fluid pump and a control valve coupled to the fluid reservoir and adapted to introduce and remove the fluid from the closed chamber.

3. The autostereoscopic display system of claim 1, wherein the fluid reservoir is a syringe having a handle for transferring fluid to and from the syringe.

4. An autostereoscopic lenticular screen apparatus, comprising:
   a display screen having a display surface,
   a lenticular screen having lenticules disposed on one side thereof and a smooth surface on the other side thereof, said lenticular screen being held in juxtaposition to the display surface,
   a closed chamber formed between the lenticular screen and the display surface,
   a fluid reservoir coupled to the closed chamber, and
   a transfer valve coupled to the fluid reservoir for introducing and removing an optically clear fluid from the chamber.

5. The autostereoscopie lenticular screen apparatus of claim 4, wherein the lenticular screen is oriented with the lenticules facing outwardly away from the display screen.

6. The autostereoscopic lenticular screen apparatus of claim 4, wherein the lenticular screen is oriented with the lenticules facing inwardly toward the display screen.

7. The autostereoscopic lenticular screen apparatus of claim 6, wherein the smooth surface of the lenticular screen is coated with an antireflective material.

8. The autostereoscopic lenticular screen apparatus of claim 4, wherein the fluid is a fluoropolymer.

9. The autostereoscopic lenticular screen apparatus of claim 4, wherein the fluid has an index of refraction that is similar to that of the lenticules.

10. The autostereoscopie lenticular screen apparatus of claim 9, wherein the fluid has an index of refraction that is identical to that of the lenticules.

11. The autostereoscopic lenticular screen apparatus of claim 4, wherein the lenticular screen is a substrate having lenticules disposed on one side thereof.

12. The autostereoscopic lenticular screen apparatus of claim 11, wherein the substrate is glass.

13. The autostereoscopic lenticular screen apparatus of claim 4, wherein the fluid reservoir is a syringe and the transfer valve is a pump handle on the syringe.

14. A method for switching an autostereoscopic display system between a planar viewing mode and a stereoscopic viewing mode, wherein a lenticular screen having lenticules disposed on one side thereof is aligned in juxtaposition with a display screen, comprising:
   forming a closed chamber between the lenticular screen and the display screen,
   introducing an optically clear fluid into a portion of the closed chamber to thereby deactivate the lenticular screen, and
   removing the optically clear fluid from the closed chamber to thereby activate the lenticular screen.

15. The method for switching an autostereoscopic system as in claim 14, wherein the lenticular screen is oriented with the lenticules facing outwardly away from the display screen.

16. The method for switching an autostereoscopic system as in claim 14, wherein the lenticular screen is oriented with the lenticules facing inwardly toward the display screen.

17. The method for switching an autostereoscopic system as in claim 16, wherein the lenticular screen has a smooth surface opposite the one side which is coated with an antireflective material.

* * * * *